A. LANDINI.
MOTOR CAR.
APPLICATION FILED MAY 29, 1919.

1,401,797. Patented Dec. 27, 1921.

INVENTOR
ACHILLE LANDINI
BY Munn & Co.
ATTORNEYS

UNITED STATES PATENT OFFICE.

ACHILLE LANDINI, OF CAMERI, ITALY.

MOTOR-CAR.

1,401,797.

Specification of Letters Patent. Patented Dec. 27, 1921.

Application filed May 29, 1919. Serial No. 300,566.

*To all whom it may concern:*

Be it known that I, ACHILLE LANDINI, gentleman, residing at Cameri, Novara-Italy, in the Kingdom of Italy, have invented new and useful Improvements in Motor-Cars, of which the following is a specification.

The invention refers to a motor car very simple and economical in construction, in which the arrangement of the various parts is so designed as to realize a substantial saving in weight and size the whole portion of the carriage length heretofore allotted to the motor and radiator being saved without prejudicing the accessibility of the motor.

In the annexed drawing the invention is illustrated by way of example as applied to a single-seated motor car.

Figure 1:
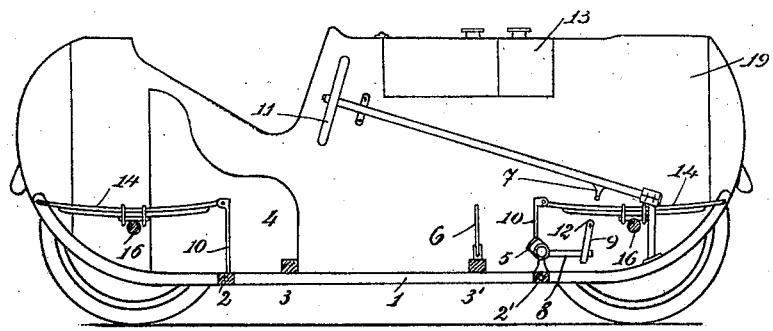
Figure 2:
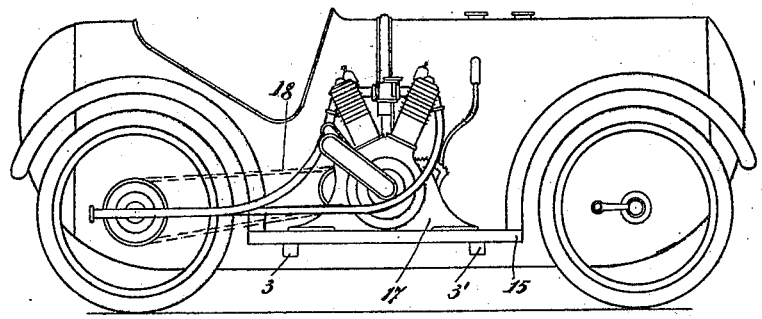

Figure 1 is a longitudinal section of the motor-car;

Fig. 2 a side view, and

Figure 3:
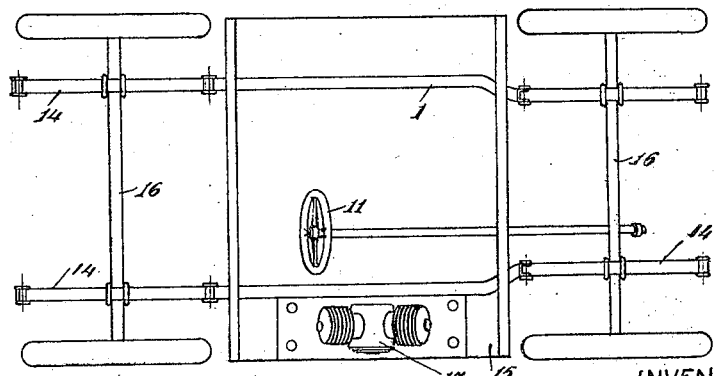

Fig. 3 a plan of the same.

The frame consists of longitudinal beams whose two ends are curved in such a way that their center portion corresponding to the center portion of the coachwork is straight and very low, being near to ground and at any rate beneath the line connecting the road wheel centers. 2—2 are cross beams, to which are secured the uprights 10, whose top ends, as well as the ends of the longitudinal beams 1, are suspended from the springs 14 which rest on the axles 16. The cross-beam 2′ further serves to support the pedal 5. 3—3′ are two further cross beams resting on the longitudinal beams 1 and supporting the seat 4 and the brake lever 6 respectively; the cross-beams 3—3′ are projecting on the two sides past the longitudinal beams 1, so as to build supporting brackets for the sidesteps 15.

The engine 17 is arranged outside on one of the sidesteps, and actuates the rear road wheel through chain and sprocket wheels. The engine may be of the motor-cycle type and air-cooled, the radiator for the cooling water being thus dispensed with; yet any other, even water-cooled, engine construction could be adopted.

The steering gear can be operated both through the handwheel 11 and the pedal 5. Pedal 5 actuates through a pawl 8 the lever 9 which in its turn actuates the steering shaft at 12 in a well known manner for instance by a bevel gear meshing with a bevel gear on a vertical steering shaft of the usual type. When the steering gear is operated by means of the handwheel 11, the transmission to the steering shaft is effected through a pinion keyed at 7, and not shown in the drawing.

The coachwork 19 consists of thin sheet metal detachably secured to the frame. At 13 there is arranged the liquid fuel tank, which in the case of larger capacities could also be arranged at the rear of the seat. In the forward or slightly extended portion a second passenger-seat could be provided; also side seats could be provided at 4, and behind these two, further side-seats could be arranged by suitably lengthening the frame.

Of course the constructional details and those referring to the form of the various parts may be altered from those shown and illustrated without departing from the spirit and scope of the invention.

Having now described my invention and how the same is to be carried out, what I claim as my invention is:

1. A motor car having a frame built up of longitudinal beams having their end portions curved upwardly, axles arranged transversely above said curved end portions, wheels on said axles, springs extending longitudinally and resting on said axles intermediately, the intermediate straight length of the beams being arranged beneath the line connecting the wheel centers, cross beams interconnecting the longitudinal beams and suspended with the ends of the longitudinal beams from the ends of the springs, certain of said cross beams extending laterally past the longitudinal beams, a coachwork arranged over the beams and springs, sidesteps supported by said cross beams outwardly of the coachwork on the extended ends of said cross beams, a motor arranged on one of said steps and a drive connection between the motor and a rear wheel.

2. A motor car comprising a chassis frame consisting of longitudinal side beams having their end portions curved upwardly, cross beams interconnected to the longitudinal beams and extending beyond the same at the sides, axles arranged transversely above the curved portions of the longitudinal beams, springs supported thereby, said longitudinal beams and cross beams being suspended from said springs, sidesteps supported by said cross beams outwardly of the longitudinal beams, an air cooled motor mounted on one of the steps, a chain and sprocket connection between the motor and a rear road wheel, and a sheet metal coachwork arranged over the chassis and surrounding the same, except the steps and motor, together with the drive chain thereof.

3. A motor car comprising a chassis frame consisting of longitudinal side beams having their end portions curved upwardly, cross beams interconnected to the longitudinal beams and extending beyond the same at the sides, axles arranged transversely above the curved portions of the longitudinal beams, springs supported thereby, said longitudinal beams and cross beams being suspended from said springs, at the ends of said springs, certain of said cross beams terminating at the longitudinal beams, supporting wheels on the ends of said axles, sidesteps supported by the extended ends of the cross beams outwardly of the longitudinal beams, a seat arranged upon certain of said cross beams and longitudinal beams, a brake lever arranged upon one of said cross beams and having connection with certain brake mechanism, a coachwork over said chassis, including the longitudinal beams, cross beams, springs, seat and brake lever, and a motor having operative connection with certain of the wheels.

4. A motor car comprising a chassis frame consisting of longitudinal side beams having their end portions curved inwardly, cross beams interconnected to the longitudinal beams and extending beyond the same at the sides, axles arranged transversely above the curved portions of the longitudinal beams, springs supported thereby, said longitudinal beams and cross beams being suspended from said springs, at the ends of said springs, certain of said cross beams terminating at the longitudinal beams, supporting wheels on the ends of said axles, sidesteps supported by the extended ends of the cross beams outwardly of the longitudinal beams, a seat arranged upon certain of said cross beams and longitudinal beams, a brake lever arranged upon one of said cross beams and having connection with certain brake mechanism, a coachwork over said chassis, including the longitudinal beams, cross beams, springs, seat and brake lever, an air-cooled motor arranged upon one of the steps and having drive connections with one of the rear wheels, controlling means for the motor, fuel supply means carried by the coachwork, said longitudinal beams having their intermediate straight lengths arranged beneath the line connecting the road wheel centers, and steering means associated with the front wheels and operative from the seat.

5. In a motor car a frame consisting of two longitudinal beams underhung in respect of the axles and supported thereby at midlength of springs one end of which are pivoted to the upward bent extremity of the beams and the other to uprights erected on said beams, of cross beams interconnecting said longitudinal bars and projecting laterally therefrom to support the side steps, and the motor on one thereof and a chain and sprocket wheels to drive the rear axle and of a sheet metal coachwork surrounding all the content between the inner edges of the side steps, substantially as described and shown, in the annexed drawings.

ACHILLE LANDINI.